US012350750B2

(12) United States Patent
Trimmer et al.

(10) Patent No.: US 12,350,750 B2
(45) Date of Patent: Jul. 8, 2025

(54) METHODS AND SYSTEMS OF ELECTROCHEMICAL MACHINING

(71) Applicant: General Electric Company, Schenectady, NY (US)

(72) Inventors: Andrew Lee Trimmer, Niskayuna, NY (US); John Malott Cottrill, Franklin, OH (US); Douglas Carl Hofer, Clifton Park, NY (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 425 days.

(21) Appl. No.: 17/843,286

(22) Filed: Jun. 17, 2022

(65) Prior Publication Data

US 2023/0407517 A1    Dec. 21, 2023

(51) Int. Cl.
*B23H 3/04* (2006.01)
*B23H 9/10* (2006.01)

(52) U.S. Cl.
CPC ............... *B23H 3/04* (2013.01); *B23H 9/10* (2013.01); *B23H 2300/10* (2013.01)

(58) Field of Classification Search
CPC .................................................. B23H 3/00–12
See application file for complete search history.

(56) References Cited

U.S. PATENT DOCUMENTS

| | | |
|---|---|---|
| 3,062,192 A | 11/1962 | Webb |
| 3,252,882 A | 5/1966 | Williams |
| 3,271,291 A | 9/1966 | Howard et al. |
| 3,357,906 A | 12/1967 | Jollis et al. |
| 3,372,099 A * | 3/1968 | Clifford ............ B23H 3/04 428/420 |
| 3,430,851 A | 3/1969 | Abt |
| 3,616,346 A | 10/1971 | Inoue |
| 3,654,116 A | 4/1972 | Inoue |
| 3,975,245 A | 8/1976 | Bergquist et al. |
| 4,026,779 A | 5/1977 | Shaw |
| 4,052,284 A | 10/1977 | Schrader |

(Continued)

FOREIGN PATENT DOCUMENTS

| | | |
|---|---|---|
| CN | 10365884 B | 4/2016 |
| DE | 102019216048 | 4/2021 |

(Continued)

OTHER PUBLICATIONS

Bhattacharyya et al., Electrochemical Machining: New Possibilities for Micromachining, Robotics and Computer-Integrated Manufacturing, vol. 18, Issues 3-4, 2002, pp. 283-289.

(Continued)

*Primary Examiner* — Hosung Chung
(74) *Attorney, Agent, or Firm* — Smith, Gambrell & Russell LLP (57) ABSTRACT

Methods and systems of electrochemically machining a component are provided. The method may include applying two or more potentials to a tool electrode comprising an array of two or more individual electrodes to generate two or more electric fields in between the tool electrode and a workpiece opposite of the tool electrode, wherein each of the two or more electric fields is generated by one of the array of two or more individual electrodes.

16 Claims, 9 Drawing Sheets

(56) References Cited

U.S. PATENT DOCUMENTS

| | | |
|---|---|---|
| 4,336,122 A | 6/1982 | Spirig |
| 4,522,692 A | 6/1985 | Joslin |
| 4,851,090 A | 7/1989 | Burns et al. |
| 5,114,548 A | 5/1992 | Rhoades |
| 5,310,468 A | 5/1994 | Bruns et al. |
| 5,314,598 A | 5/1994 | Glew |
| 5,714,054 A | 2/1998 | Frembgen |
| 5,882,491 A | 3/1999 | Wardle |
| 6,203,684 B1 | 3/2001 | Taylor et al. |
| 6,231,692 B1 | 5/2001 | Vogt et al. |
| 6,319,384 B1 | 11/2001 | Taylor et al. |
| 6,402,931 B1 | 6/2002 | Zhou et al. |
| 6,489,582 B1 | 12/2002 | Roedl et al. |
| 6,558,231 B1 | 5/2003 | Taylor |
| 6,624,377 B2 | 9/2003 | Gianchandani et al. |
| 6,723,223 B2 | 4/2004 | Zaitsev et al. |
| 6,946,062 B2 | 9/2005 | Lin et al. |
| 7,356,122 B2 | 4/2008 | Raber et al. |
| 7,394,040 B2 | 7/2008 | Wei et al. |
| 7,741,576 B2 | 6/2010 | Trimmer et al. |
| 7,867,374 B2 | 1/2011 | Zdeblick et al. |
| 7,976,694 B2 | 7/2011 | Trimmer et al. |
| 8,262,897 B2 | 9/2012 | Bayer et al. |
| 8,506,770 B2 | 8/2013 | Kiesel et al. |
| 8,742,279 B2 | 6/2014 | Gannelli et al. |
| 8,801,906 B2 | 8/2014 | Platz et al. |
| 8,906,221 B2 | 12/2014 | Holmes et al. |
| 8,974,656 B2 | 3/2015 | Trimmer et al. |
| 9,925,609 B2 | 3/2018 | Trimmer et al. |
| 9,943,921 B2 | 4/2018 | Trimmer et al. |
| 10,480,094 B2 | 11/2019 | Konopka |
| 10,487,416 B2 | 11/2019 | Trimmer et al. |
| 10,493,549 B2 | 12/2019 | Clark et al. |
| 10,507,540 B2 | 12/2019 | Lecomte et al. |
| 10,556,280 B2 | 2/2020 | Trimmer et al. |
| 2002/0033341 A1 | 3/2002 | Taylor et al. |
| 2003/0024825 A1 | 2/2003 | Lamphere et al. |
| 2005/0098445 A1 | 5/2005 | Batzinger et al. |
| 2005/0145508 A1 | 7/2005 | Larsen et al. |
| 2006/0070887 A1 | 4/2006 | Zdeblick |
| 2006/0124474 A1 | 6/2006 | Tsai |
| 2006/0257244 A1 | 11/2006 | Steplewski et al. |
| 2007/0264566 A1 | 11/2007 | Arndt et al. |
| 2009/0008265 A1 | 1/2009 | Bayer et al. |
| 2011/0303553 A1 | 12/2011 | Inman et al. |
| 2012/0211357 A1 | 8/2012 | Trimmer et al. |
| 2013/0193112 A1 | 8/2013 | Murai et al. |
| 2016/0031026 A1 | 2/2016 | Taylor et al. |
| 2016/0045968 A1 | 2/2016 | Keller et al. |
| 2016/0256945 A1 | 9/2016 | Goto et al. |
| 2016/0362810 A1 | 12/2016 | Trimmer et al. |
| 2017/0087655 A1 | 3/2017 | Bonini |
| 2017/0239741 A1 | 8/2017 | Furuta |
| 2018/0169112 A1 | 6/2018 | Schmidt |
| 2019/0210130 A1 | 7/2019 | Bittner et al. |
| 2023/0066556 A1 | 3/2023 | Herrington |
| 2023/0407516 A1 | 12/2023 | Trimmer |

FOREIGN PATENT DOCUMENTS

| | | |
|---|---|---|
| EP | 0680801 A1 | 11/1995 |
| EP | 0767026 A1 | 4/1997 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| GB | 1081902 A | 9/1967 |
| JP | 49037016 | 10/1974 |
| JP | 59219120 | 12/1984 |
| JP | H0691431 A | 4/1994 |
| JP | 07314258 | 12/1995 |
| JP | H10511610 | 11/1998 |
| JP | 2006523951 | 10/2006 |
| JP | 2008514823 | 5/2008 |
| JP | 2010058192 | 3/2010 |
| WO | WO2006111345 A1 | 10/2006 |
| WO | 2013156205 | 10/2013 |
| WO | WO2018104339 A1 | 6/2018 |
| WO | 2021242457 | 12/2021 |

OTHER PUBLICATIONS

Guodong et al., Selection and Optimization of Electrolyte for Micro Electrochemical Machining on Stainless Steel 304, Procedia CIRP, vol. 42, 2016, pp. 412-417.

Hongyou et al., Research on Technique of Pulse Electrochemical Surface Finishing, International Conference on Measuring Technology and Mechatronics Automation, vol. 2, Zhangjiajie Hunan, Apr. 11-12, 2009, pp. 677-680.

Inman et al., Electropolishing of Passive Materials in HF-Free Low Viscosity Aqueous Electrolytes, Journal of Electrochemical Society, vol. 160, Issue 9, 2013, pp. E94-E98.

Li et al., Cathode Design of Aero-Engine Blades in Electrochemical Machining Based on Characteristics of Electric and Electrolyte Flow Field, Proceedings of the IEEE International Conference on Automation and Logistics, Qingdao, China, Sep. 2008, pp. 1469-1473.

Sabareesaan et al., Evaluation of Process Parameter Ranks in Electric Discharge Machining of Aerospace Super Alloy Using Copper Electrode, 2014 2nd International Conference on Current Trends in Engineering and Technology (ICCTET), Coimbatore, Jul. 8, 2014, pp. 556-560.

Taylor et al., Electrochemical Surface Finishing, The Electrochemical Society Interface, Fall 2014, pp. 57-61.

Taylor et al., A Pulse/Pulse Reverse Electrolytic Approach to Electropolishing and Through-Mask Electroetching, Products Finishing, Sep. 26, 2011.

U.S. Appl. No. 17/843,254; Notice of Allowance and Fees Due (PTOL-85) mailed Jan. 8, 2025; (pp. 1-8).

U.S. Appl. No. 17/843,254, filed Jun. 17, 2022, entitled "Methods and Systems of Electrochemical Machining".

U.S. Appl. No. 17/843,254; Notice of Allowance and Fees Due (PTOL-85) mailed Jan. 22, 2025; (pp. 1-2).

* cited by examiner

METHODS AND SYSTEMS OF ELECTROCHEMICAL MACHINING

FIELD OF TECHNOLOGY

The field of the disclosure generally relates to electrochemical machining, and more particularly, to methods and systems for performing electrochemical machining.

BACKGROUND

Electrochemical machining (ECM) is a process of removing electrically conductive material, such as metallic materials, by an electrochemical process. It is typically used for machining (working/finishing) a workpiece composed of an electrically conductive material. ECM is particularly useful for metals and alloys that have a high hardness, making them difficult to machine with conventional methods. For example, nickel-based alloys may be machined using ECM to manufacture a variety of components.

During the ECM process, the electrically conductive material is oxidized from the workpiece using an applied potential, allowing a current to flow at a controlled rate. The workpiece serves as an anode and is separated by a gap from a tool electrode, which serves as a cathode. The electrolyte, usually a salt solution in water, flows through the gap, flushing away the oxidized material from the workpiece. As the tool electrode moves towards the workpiece to maintain a controlled gap, the workpiece is machined into the complementary shape of the tool electrode.

BRIEF DESCRIPTION OF THE DRAWINGS

A full and enabling disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION

Reference now will be made in detail to preferred embodiments, one or more examples of which are illustrated in the drawings. Each example is provided by way of explanation of the invention, not limitation of the invention. In fact, it will be apparent to those skilled in the art that various modifications and variations can be made without departing from the scope of the invention. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "coupled," "fixed," "attached to," and the like refer to both direct coupling, fixing, or attaching, as well as indirect coupling, fixing, or attaching through at least one intermediate components or features, unless otherwise specified herein.

As used herein, the terms "first", "second", and "third" may be used interchangeably to distinguish one component from another and are not intended to signify location or importance of the individual components.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, "minimum dimensions" refers to the degree of precision an electrochemical machine is capable of producing on a workpiece. In the current state of the art, a tool electrode closely positioned to a workpiece is generally capable of reproducing surfaces on the workpiece having minimum dimensions of 2.54 µm or greater.

During the ECM process, the electrically conductive material is oxidized from the workpiece using an applied potential, allowing a current to flow at a controlled rate. The workpiece serves as an anode and is separated by a gap from a tool electrode, which serves as a cathode. The electrolyte, usually a salt solution in water, flows through the gap, flushing away the oxidized material from the workpiece. As the tool electrode moves towards the workpiece to maintain a controlled gap, the workpiece is machined into the complementary shape of the tool electrode.

ECM generally provides desired shape control and a smooth surface finish for manufacturing components including, for example, bladed disks and other component of gas turbines, jet engines, and power generation. ECM where oxidation reactions are utilized to remove material, are typically accomplished with solid metal cathodes that are an approximate inverse image of a desired final shape. While ECM is used for a number of high-volume applications, it does have limitations, including lacking the general ability to form components having precise geometric fidelity. For instance, a tool electrode operating on a workpiece closely positioned to the tool electrode is generally capable of reproducing surfaces with minimum dimensions of 2.54 micrometers (µm). However, due to the widespread adoption of additive manufacturing to produce components having closely-spaced features and complex geometries, it is desirable to generally improve ECM applications to allow for the production of components having minimum dimensions and repeated surface patterns with tolerances beyond contemporary ECM capabilities.

The present disclosure describes electrode configurations that incorporate arrays of individual electrodes rather than a monolithic tool electrode. Additionally, the present disclosure describes electrode configurations that incorporate structures that allow for electrolyte flushing to tune mass transport of ionic species and utilize specific applied potentials to each individual electrode.

Specifically, the present disclosure provides for an ECM process for electrochemically machining a workpiece in an electrochemical machining system using a tool electrode including an array of two or more individual electrodes, which may provide for high fidelity and/or submicron features on the workpiece. The ECM process generally involves using a tool electrode including an array of two or more individual electrodes, in which two or more potentials are individually applied to each of the two or more individual electrodes, resulting in the generation of two or more electric fields. In this regard, a unique potential may be applied to each of the two or more individual electrodes, permitting the individualized control of the rate of oxidation of the workpiece at strategic locations on the workpiece via the tool electrode and allowing for a workpiece to be machined to have high fidelity or submicron features (i.e., minimum dimensions of 2.54 µm or less, such as by way of non-limiting example 1 µm to 2.50 µm or by way of further non-limiting example 1.25 µm to 2.25 µm).

Figure 1:
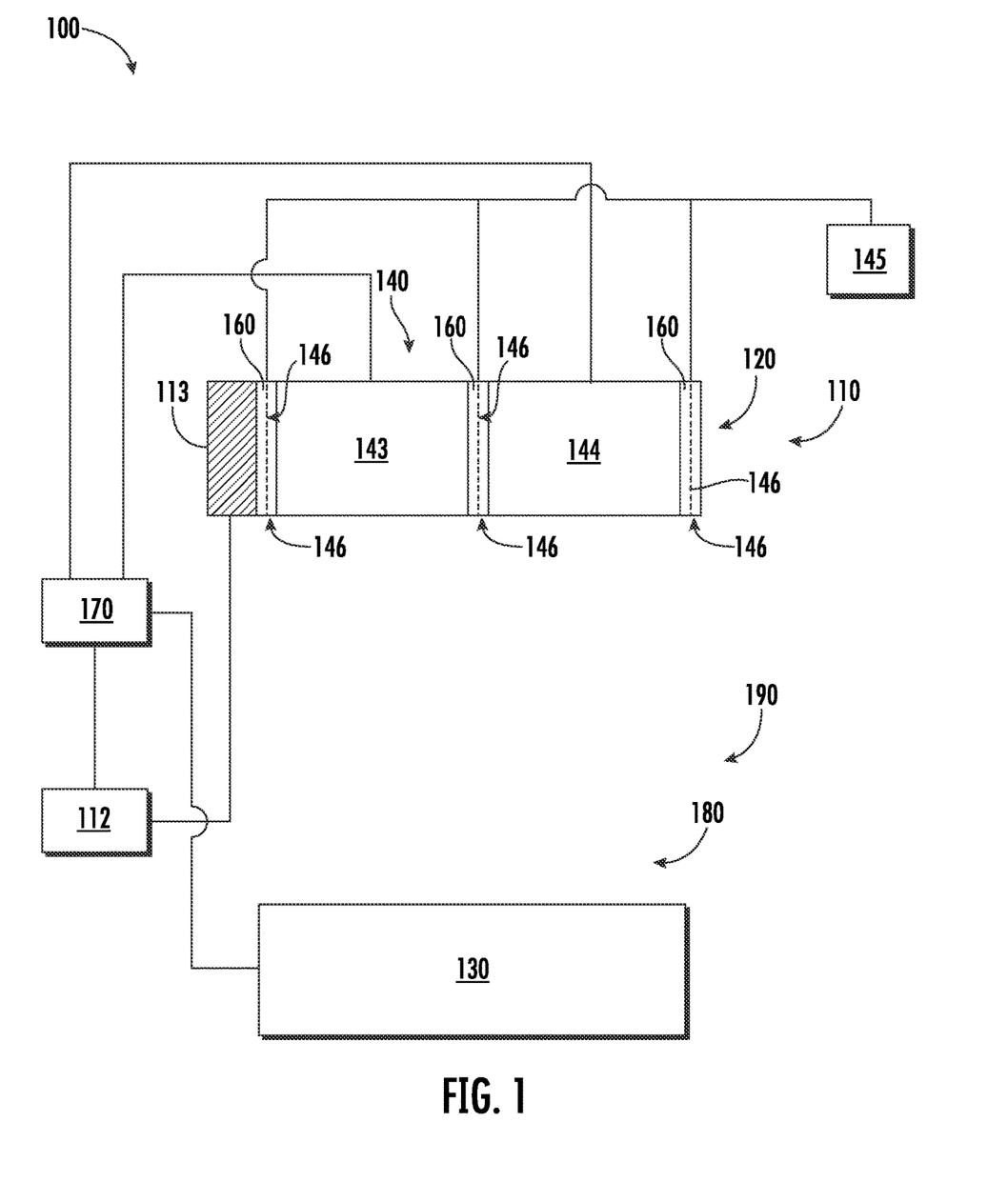
FIG. 1 shows a front schematic view of an exemplary electrochemical machining system including a tool electrode, which includes an array of two or more individual electrodes, not in operation.
Figure 2:
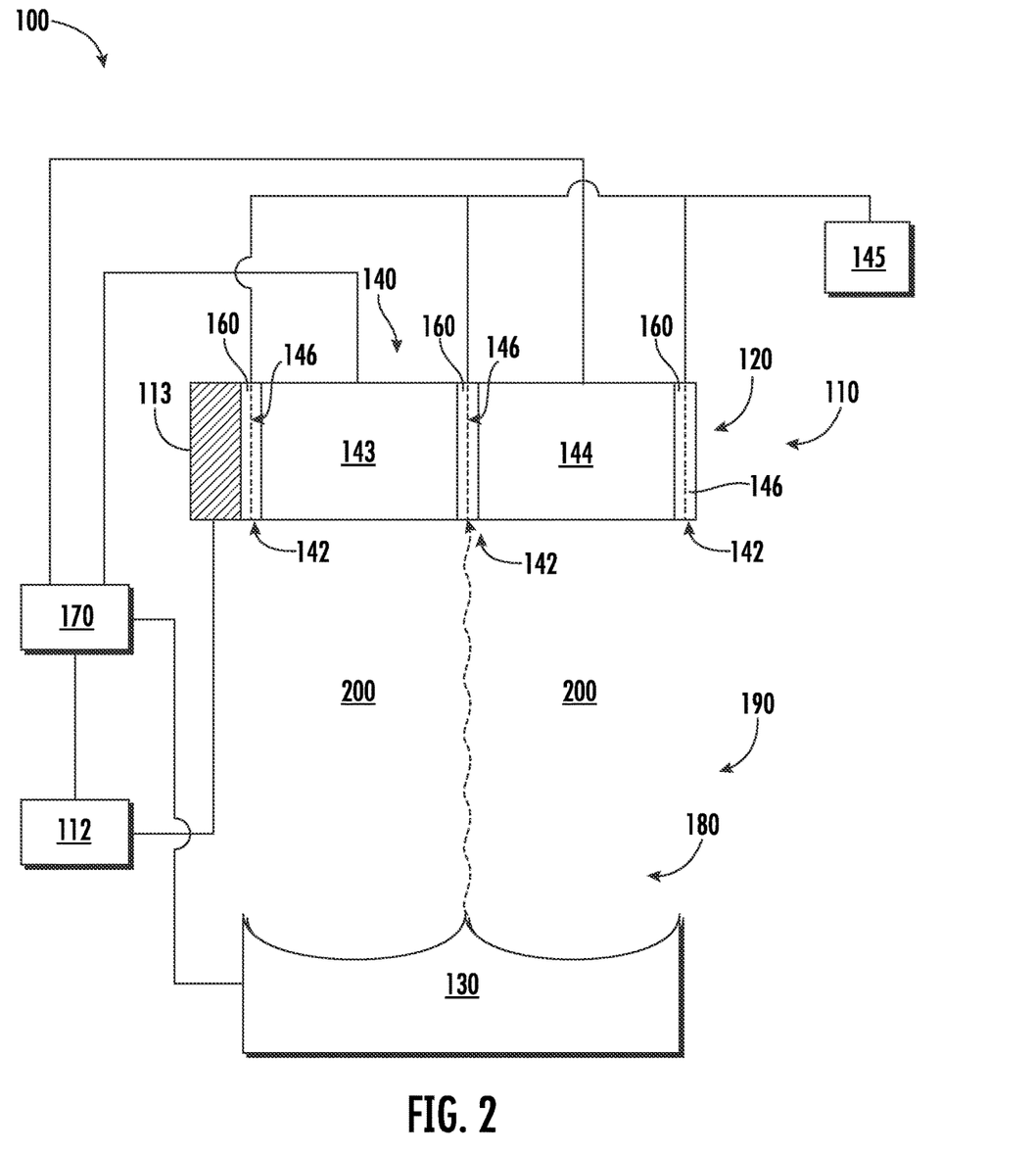
FIG. 2 shows a front schematic view of an exemplary electrochemical machining system including a tool electrode, which includes an array of two or more individual electrodes, in operation.

Referring now to the drawings, FIG. 1 shows a front schematic view of an exemplary electrochemical machining system 100 including a tool electrode 120, which includes an array of two or more individual electrodes 140, not in operation. FIG. 2 shows a front schematic view of an exemplary electrochemical machining system 100 including a tool electrode 120, which includes an array of two or more individual electrodes 140, in operation. The workpiece 130 is separated from the tool electrode 120 by an electrode gap 180, in which an electrolyte solution 190 is interspaced in between the tool electrode 120 and the workpiece 130. Although the array is shown including a first electrode 143 and a second electrode 144, the array of two or more individual electrodes 140 is not limited to two electrodes. At least one spacer 160 is positioned in between a first electrode 143 and a second electrode 144 of the array of two or more individual electrodes 140. The at least one spacer 160 includes at least one electrolyte flushing channel 141 at least one electrolyte flushing port 146. The exemplary electrochemical machining system 100 further includes an electrolyte supply 145 that contains an electrolyte solution and is in fluid communication with the at least one electrolyte flushing channel 141 of the at least one spacer 160. The electrochemical machining system 100 further includes a controller 112, a power supply 170, and an actuator 113.

Generally, at least one of the workpiece 130 and the array of two or more individual electrodes 140 include a metal material that is suitable for ECM. Moreover, in one embodiment, the workpiece 130 and the array of two or more individual electrodes may each include a metal material that is unique from each other. Alternatively, the workpiece 130 and the two or more individual electrodes may each include the same metal material. Additionally, in one embodiment, the first electrode 143 and the second electrode 144 may each include a metal material that is unique from each other. Alternatively, the first electrode 143 and the second electrode 144 may each include the same metal material.

Moreover, in one embodiment, the metal material of the present disclosure may include a pure metal or a metal alloy. Pure metals may include titanium, niobium, nickel, zirconium, palladium, platinum, or aluminum. In one embodiment, the alloys of the present disclosure may include a titanium-based alloy, niobium-based alloy, nickel-based alloy, zirconium-based alloy, palladium-based alloy, platinum-based alloy, aluminum-based alloy, or a combination thereof. However, other metal materials or alloys may be employed, including a titanium aluminide alloy.

The workpiece 130 and the two or more individual electrodes of the electrochemical machining system 100 may be electrically connected in at least one electrical circuit. In an exemplary embodiment, as shown in FIGS. 1 and 2, the workpiece 130 and the two or more individual electrodes are electrically connected in one circuit. However, in another embodiments, the workpiece 130 and the two or more individual electrodes may be electrically connected in two or more circuits. Moreover, in one embodiment as shown in FIGS. 1 and 2, the first electrode 143 and the second electrode 144 may be electrically connected in parallel with the workpiece 130.

The electrolyte solution 190 interspaced between the tool electrode 120 and the workpiece 130 may include any suitable electrolyte, such as a base, an acid, or an ionic liquid. In some embodiments, the electrolyte solution 190 includes ionic salts, binary acids, organic acids, deep eutectics, molten salts or combinations thereof. The electrolyte solution may be an aqueous electrolyte such as an aqueous salt electrolyte including water and at least one salt. In one embodiment, the electrolyte solution 190 includes an aqueous salt electrolyte, which includes sodium nitrate, sodium chloride, sodium bromide, or a combination thereof. In some embodiments, the electrolyte solution 190 may constitute from 10 percent of the aqueous salt (by weight) to 30 percent of the aqueous salt (by weight). For example, an electrolyte solution 190 constituting 20 percent sodium nitrate (by weight) may be used for electrochemically machining nickel-based alloys such as Inconel 718. Additionally, the electrolyte is generally pH adjusted depending on the material being electrochemically machined. For instance, the electrolyte may be pH adjusted to have a pH from 5 to 10. However, it will be appreciated that other aqueous solution electrolytes may be employed with the techniques of the present disclosure.

As shown in FIGS. 1 and 2, an exemplary electrochemical machining system 100 includes at least one spacer 160. The at least one spacer 160 may be positioned in between the first electrode 143 and the second electrode 144. The at least one spacer 160 contains a nonconductive material, which electrically isolates the first electrode 143 and the second electrode 144 from each other such that the generation of the two or more electric fields 200 may be achieved in between the tool electrode 120 and the workpiece 130 when the electrochemical machining system 100 is in operation, as shown in FIG. 2. For example, the at least one spacer 160 may contain a fiberglass reinforced nonconductive material, such as a fluoropolymer.

In one embodiment, the at least one spacer 160 may have a thickness of 100 micrometers to 2500 micrometers, such as from 350 micrometers 2000 micrometers, such as from 500 micrometers to 1500 micrometers. In one embodiment, the at least one spacer 160 may have a thickness of 750 micrometers 2000 micrometers.

In one embodiment, the electrochemical machining system 100 further includes an electrolyte supply 145 configured to deliver a charged or uncharged electrolyte solution 142 to the at least one electrolyte flushing port 146. The electrolyte supply 145 may contain electrolyte solution and be in fluid communication with the at least one electrolyte flushing port 146 of the at least one spacer 160. The electrolyte supply 145 may feed electrolyte solution to the at least one spacer 160 using any suitable means know in the art. For instance, a conventional pump (not shown) may be employed to move electrolyte solution from the electrolyte supply 145 to the at least one spacer 160.

Figure 3:
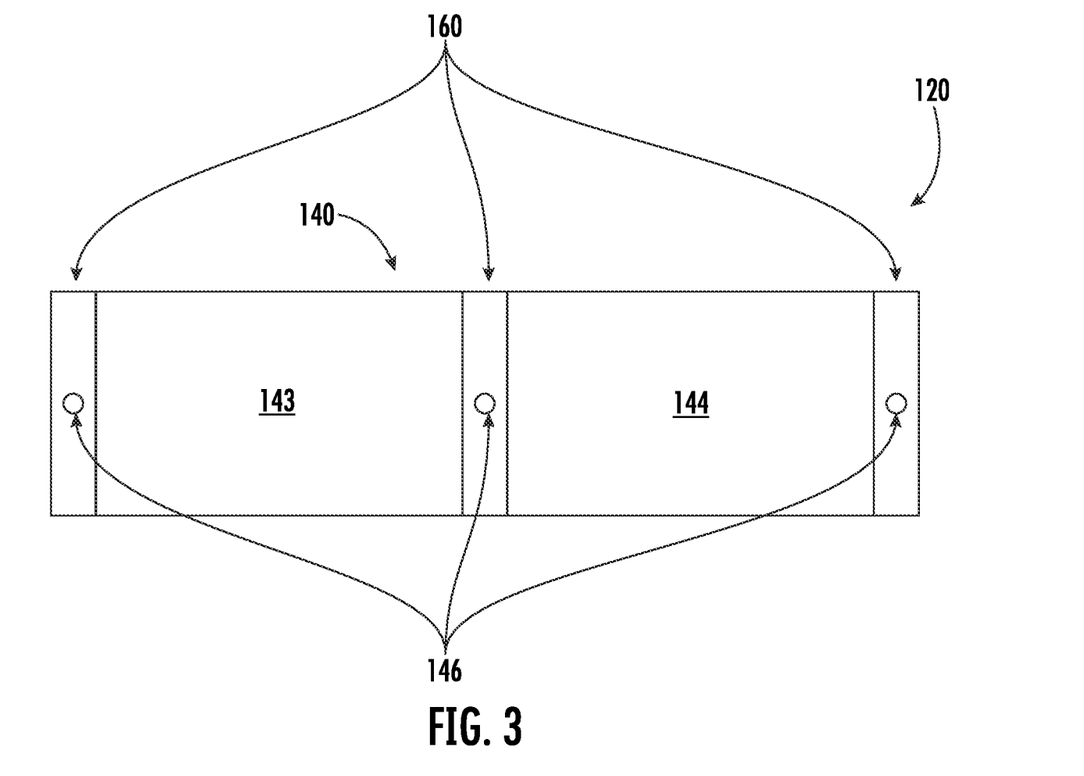
FIG. 3 shows a bottom perspective view of the tool electrode of FIGS. 1 and 2.

FIG. 3 shows a bottom perspective view of the tool electrode 120 of FIGS. 1 and 2. As shown, the at least one spacer 160 is preferably positioned at a position opposite the workpiece 130 such that charged or uncharged electrolyte solution 142 (FIG. 2) can be delivered through the at least one electrolyte flushing port 146 into the electrode gap 180 (FIGS. 1 and 2) of the electrochemical machining system 100 (FIGS. 1 and 2). In this regard, flushing of any material electrochemically machined from the workpiece 130 (FIGS. 1 and 2) may be enhanced, particularly in traditional flow box applications.

The at least one electrolyte flushing port 146, as shown in FIGS. 1-3, is a hollow cavity in the at least one spacer 160 that is generally cylindrical in shape. Moreover, as shown in FIG. 3, the at least one electrolyte flushing port 146 is positioned generally in the center of the at least one spacer 160. However, the three-dimensional geometry of the electrolyte flushing port 146 may be in the form of other shapes and may be positioned at other positions in the at least one spacer 160, so long as the charged or uncharged electrolyte solution 142 may sufficiently "flush" any material electrochemically machined from the workpiece 130.

As used herein, the phrase "operatively connected" should be understood to mean that the respective components may be connected (for example, mechanically or electrically) directly or may be connected via other components. In one embodiment, the electrochemical machining system 100 may further include a controller 112, a power supply 170, and an actuator 113. The controller 112 may be operably connected to the power supply 170 for adjusting the voltages of the two or more potentials as desired. The controller 112 may further be operably connected to the actuator 113 for adjusting the position of the tool electrode 120 and/or the workpiece 130 during the ECM process. The controller 112 and power supply 170 may be a combined unit, although shown as a separate unit in FIGS. 1-2. Moreover, the controller 112 may include a single controller 112 configured to adjust the two or more potentials applied to the electrochemical machining system 100, as shown in FIGS. 1-2. Alternatively, the controller 112 may include two or more controller 112, each of the two or more controller 112s configured to adjusted one of the two or more potentials applied to the electrochemical machining system 100. Further, in some embodiments, the controller 112 can be configured and function in the same or similar manner as one of the computing devices 402 of the computing system 400 of FIG. 4.

Figure 4:
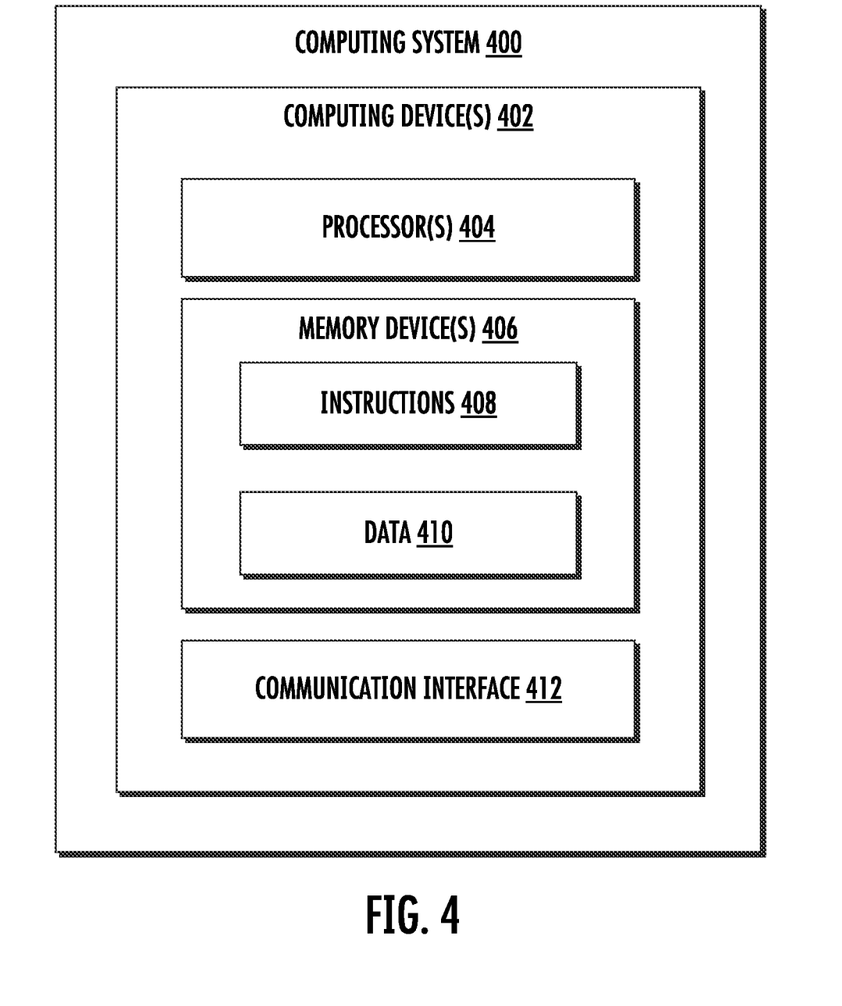
FIG. 4 shows a schematic view of a computing system including computing devices, in which one of the computing devices may function the same or similar to a controller of the present disclosure.

FIG. 4 provides an example computing system 400 in accordance with an example embodiment of the present subject matter. The controller 112 described herein can include various components and perform various functions of the at least one computing devices 402 of the computing system 400 described below.

As shown in FIG. 4, the computing system 400 can include at least one computing device(s) 402. The computing device(s) 402 can include at least one processor(s) 404 and at least one memory device(s) 406. The at least one processor(s) 404 can include any suitable processing device, such as a microprocessor, microcontroller 112, integrated circuit, logic device, and/or other suitable processing device. The at least one memory device(s) 406 can include at least one computer-readable media, including, but not limited to, non-transitory computer-readable media, RAM, ROM, hard drives, flash drives, and/or other memory devices.

The at least one memory device(s) 406 can store information accessible by the at least one processor(s) 404, including computer-readable instructions 408 that can be executed by the at least one processor(s) 404. The computer-readable instructions 408 can be any set of instructions that when executed by the at least one processor(s) 404, cause the at least one processor(s) 404 to perform operations, such as any of the operations described herein. For instance, the methods provided herein can be implemented in whole or in part by the computing system 400. The computer-readable instructions 408 can be software written in any suitable programming language or can be implemented in hardware. Additionally, and/or alternatively, the computer-readable instructions 408 can be executed in logically and/or virtually separate threads on processor(s) 404. The memory device(s) 406 can further store data 410 that can be accessed by the processor(s) 404. For example, the data 410 can include models, databases, etc.

The computing device(s) 402 can also include a network interface 412 used to communicate, for example, with the other components of the electrochemical machining system 100 (e.g., via a network). The network interface 412 can include any suitable components for interfacing with at least one network(s), including for example, transmitters, receivers, ports, antennas, and/or other suitable components.

In one embodiment, the is utilized in a traditional, flow box application, as generally shown in FIGS. 1-2. Alternatively, the electrochemical machining system 100 of the present disclosure can be operated openly, without an electrolyte containment box, for machining operations, as generally shown in FIGS. 5A-5D. Configurations of this kind are similarly capable of controlling the oxidation of the workpiece 130 at strategic locations on the workpiece 130's surface 131 according to the systems and methods of the present disclosure.

In one embodiment, the two or more potentials to the tool electrode 120 may be applied selectively such that the tool electrode 120 travels in a non-linear direction into the workpiece 130, as shown in FIGS. 5A-5D. Various components are omitted from the electrochemical machining system 100 of FIGS. 5A-5D, including components such as the power supply 170, controller 112, and actuator 113 (FIGS. 1 and 2) for the purpose of clarity, and it should be interpreted that the electrochemical machining system 100 of FIGS. 5A-5D may include some or all of the features of the electrochemical machining system 100 of FIGS. 1-2. As shown generally in FIGS. each of the two or more individual electrodes 140 can be applied with a unique potential having a precisely controlled voltage, generating two or more electric fields 200 that are unique from one another and oxidize the workpiece 130 at different rates. Thus, the production of components having complex geometries may be achieved, as well as the production of components having a reworked internal cavity 133.

Figure 5A:
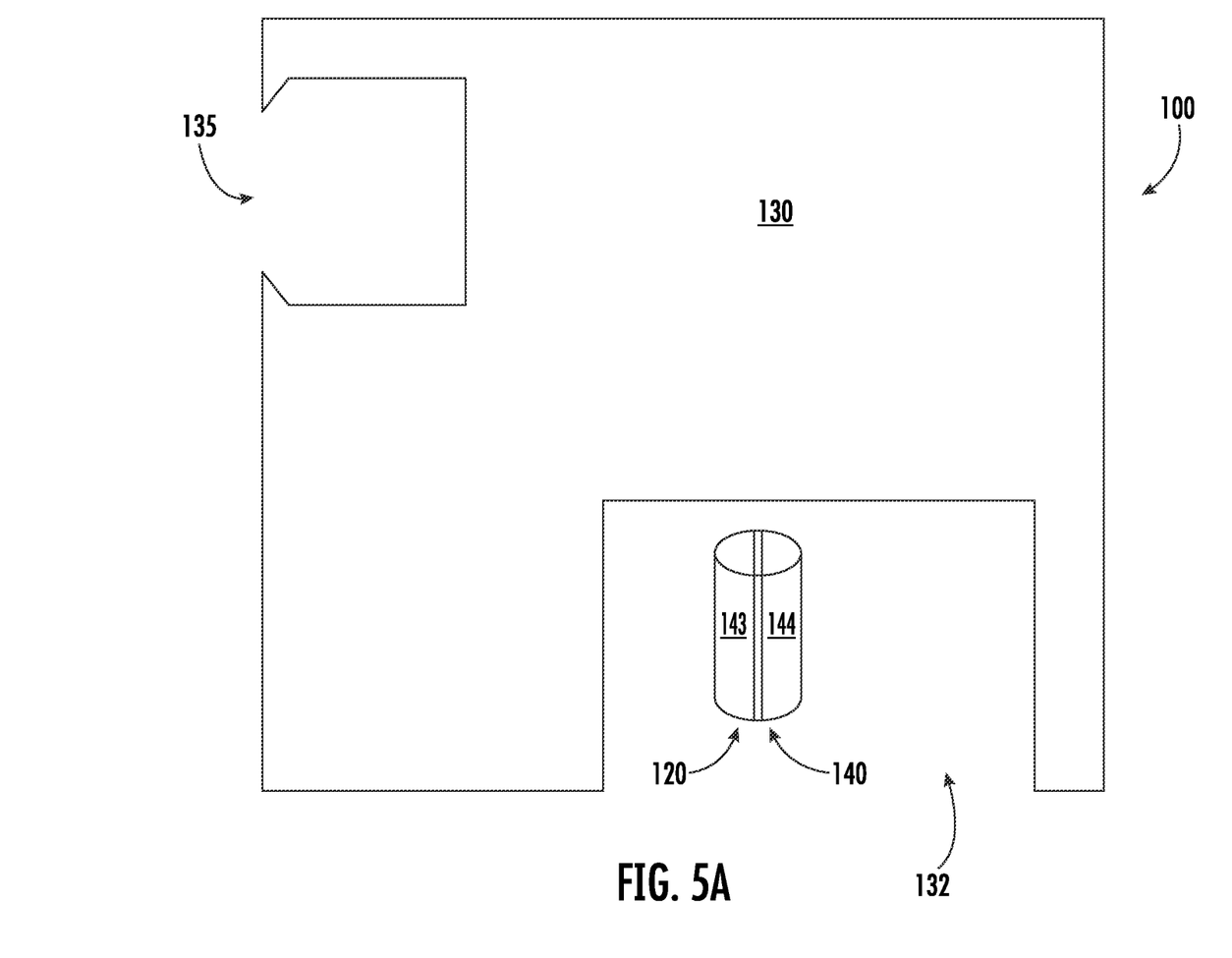
FIGS. 5A-5D show a schematic view of an exemplary embodiment of a tool electrode traveling in a non-linear direction into a workpiece.
Figure 5B:
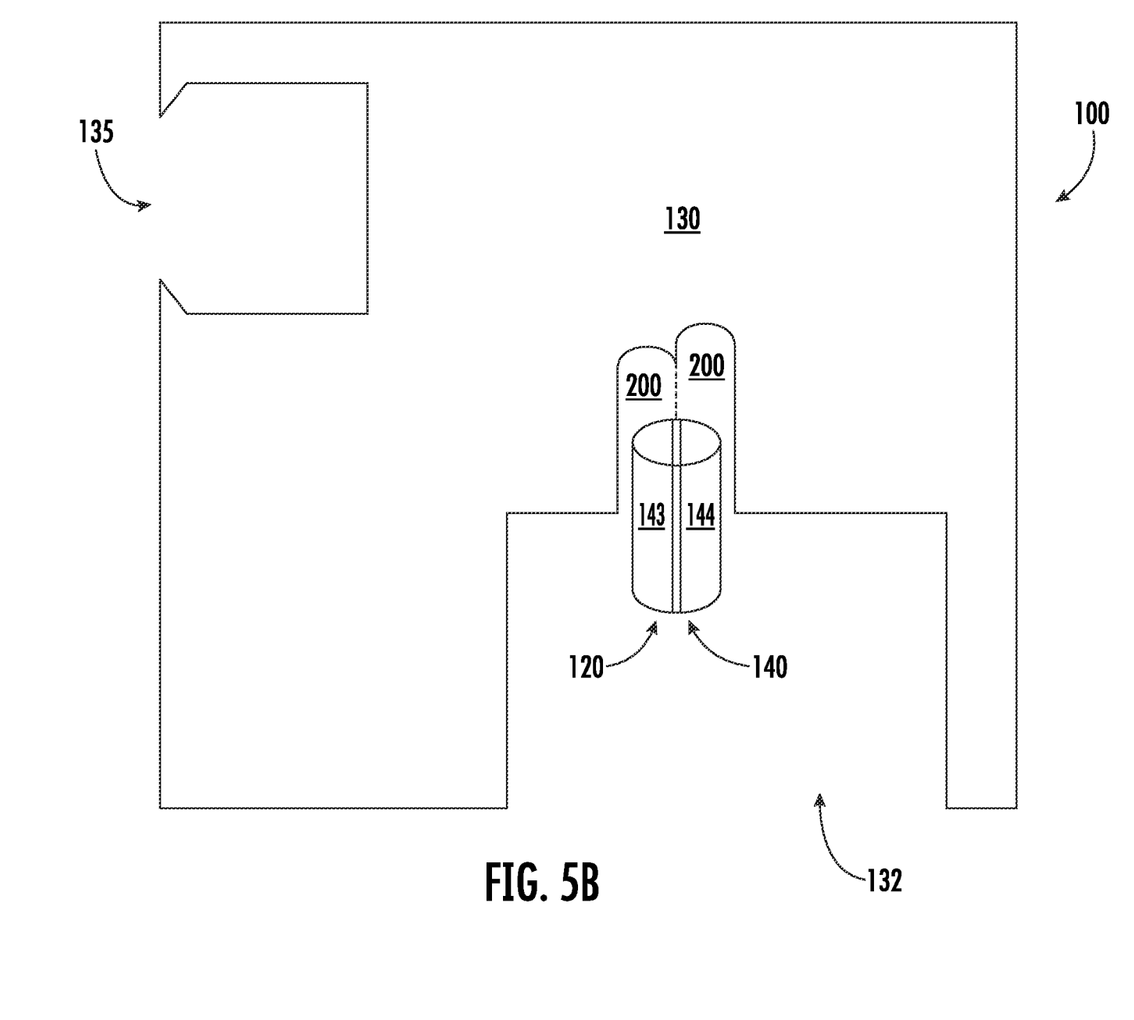
Figure 5C:
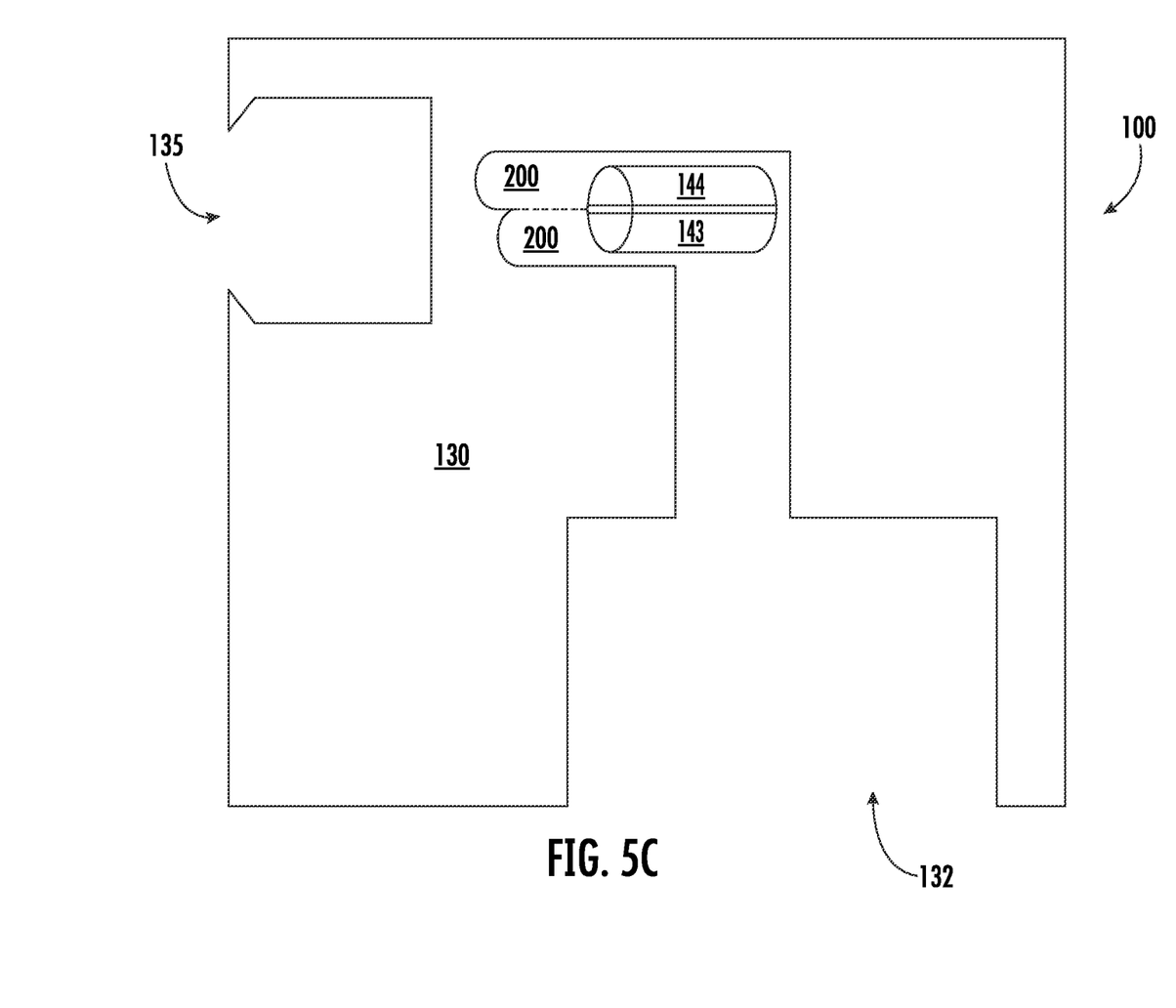
Figure 5D:
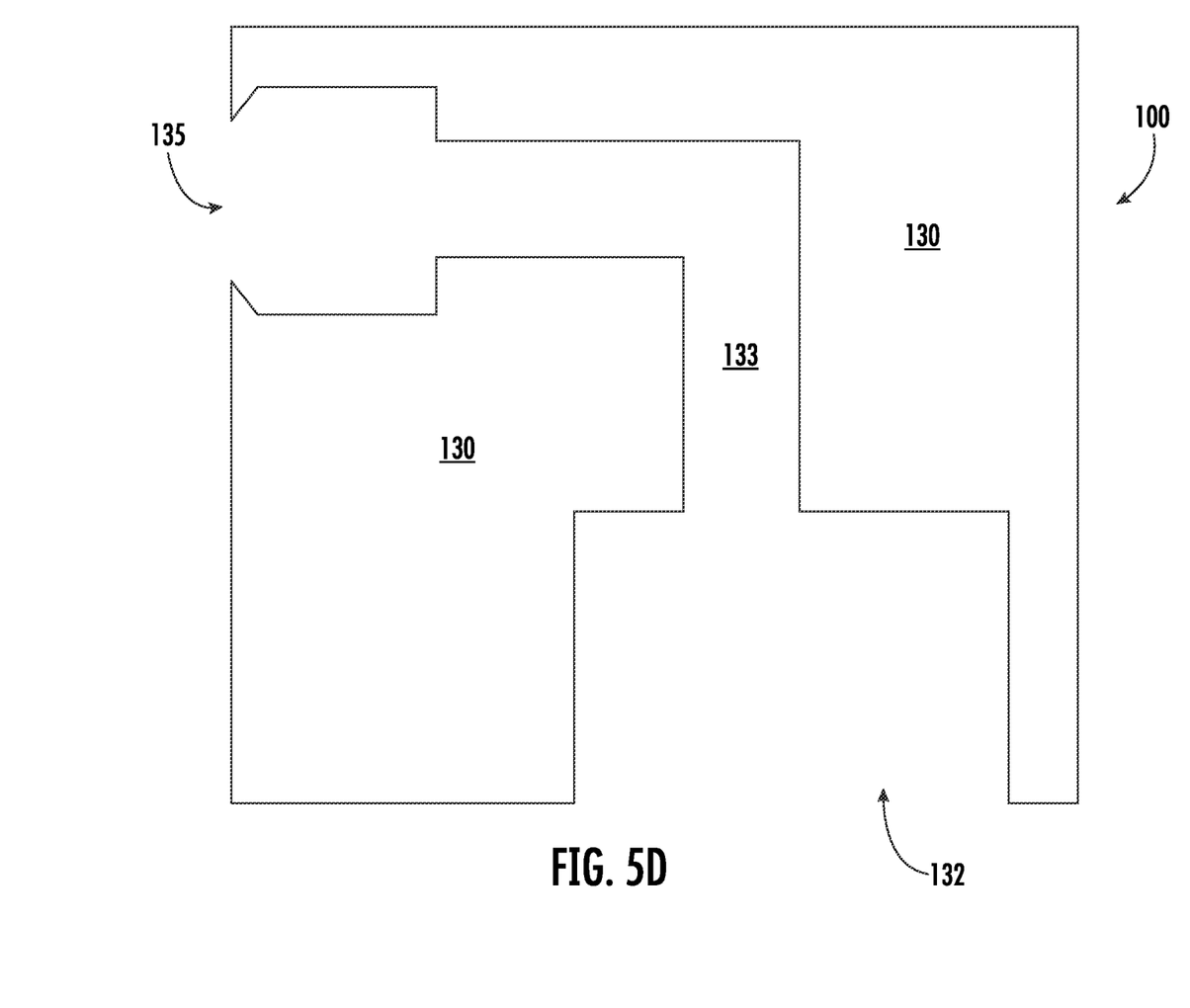

For instance, as shown in FIG. 5A, the electrochemical machine is positioned at a first opening 132 of the workpiece 130 at which the reworked internal cavity 133 (FIG. 5D) is desired to be formed. A method of electrochemical machining may then be performed as described herein, in which two or more potentials may be applied to a tool electrode 120 comprising an array of two or more individual electrodes 140 to generate two or more electric fields 200 in between the tool electrode 120 and a workpiece 130 opposite of the tool electrode 120. As shown in FIGS. 5B and 5C, performed a method of electrochemical machining as described by the present disclosure allows for the tool electrode 120 to travel in a non-linear direction into the workpiece 130 from the first opening 132 to a second opening 135. Thus, a workpiece 130 having a reworked internal cavity 133, as shown in FIG. 5D, may be formed. Moreover, the methods and systems described above with respect to non-linear electrochemical machining can be combined with other features as described throughout the present disclosure, such as the delivery of a charged or uncharged electrolyte solution 142 through at least one electrolyte flushing port 146.

Figure 6:
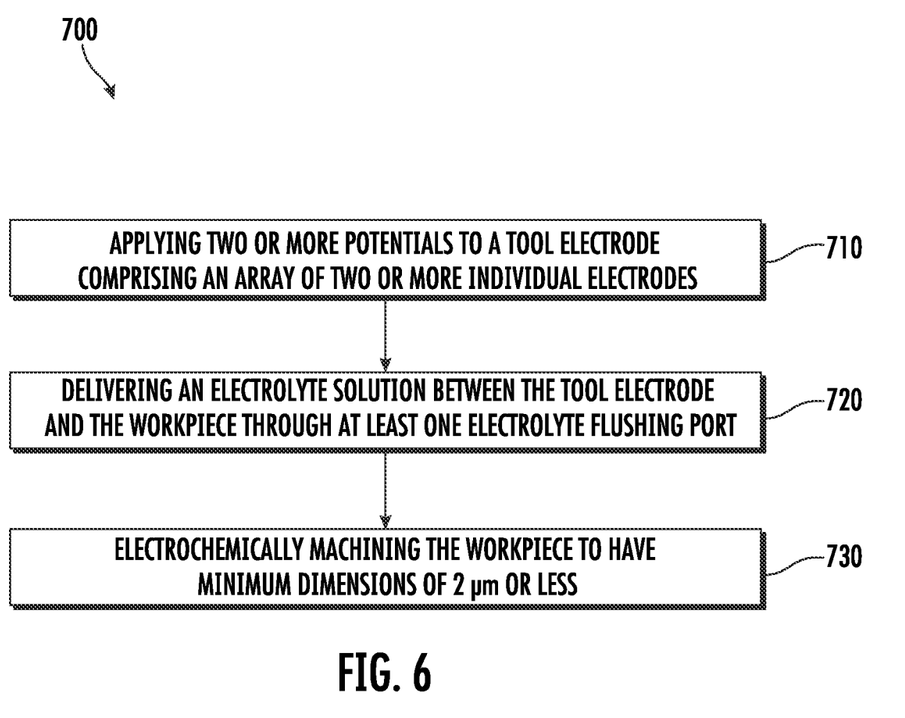
FIG. 6 shows a flow chart diagram of a method of electrochemical machining according to the present disclosure.

In another embodiment, a method 700 of electrochemically machining a component is generally provided, as shown in FIG. 6. The method includes applying two or more potentials to a tool electrode including an array of two or more individual electrodes to generate two or more electric fields in between the tool electrode and a workpiece opposite of the tool electrode 710, wherein each of the two or more electric fields is generated by one of the array of two or more individual electrodes.

Applying the two or more potentials to the tool electrode may be performed using a power supply. The configuration of the power supply to the array of two or more individual electrodes permits at least two of the two or more potentials to have different voltages from one another. Thus, in one embodiment, the two or more potentials may include a first potential and a second potential. In this regard, a unique potential may be applied to each of the two or more individual electrodes of the electrochemical machining system, permitting the individualized control of the rates of oxidation of the workpiece at strategic locations on the workpiece, and thereby allowing for a workpiece to be machined to have high fidelity or submicron features. The power supply may include two or more individual power supplies, although shown as a single power supply in FIG. 1.

During operation, the workpiece may act as an anode for the array of the two or more individual electrodes, which includes the first electrode and second electrode that may each individually act as a cathodes, generating the two or more electric fields in which an electrochemical reaction takes place between the workpiece and the tool electrode.

The first potential and second potential may be unique pulsed potentials, or alternatively, unique DC potentials. In one embodiment at least one of the first potential and the second potential is a direct current potential in a range of 2 volts to 50 volts. In further embodiment, at least one of the first potential and the second potential is a direct current potential in a range of 12 volts to 35 volts.

In another embodiment, at least one of the first potential and the second potential is a pulsed potential. Specifically, the power supply may be configured to apply a pulsed potential to at least one of the first electrode and the second electrode. Moreover, the controller may be configured to adjust the pulse durations, frequencies and voltages of the pulsed potential supplied to tool electrode and workpiece. In a further embodiment, the pulsed potential may be a bipolar pulsed potential.

For instance, the pulse durations of the pulsed potential may be from 10 nanoseconds to 500 microseconds. Additionally, in one embodiment, the pulsed potential may be applied at a voltage of 2 volts to 35 volts, such as 5 volts to 15 volts.

As used herein, the term "average potential" is an average of the off-time potential and the on-time potential of each pulsed potential. In some embodiments, the average potential of the pulsed potential may be in a range or from 5 volts to 32 volts.

Referring again to FIG. 6, the method may further include delivering a charged or uncharged electrolyte solution into the electrochemical machining through the at least one of the electrolyte flushing port 710. Delivery an uncharged electrolyte solution provides for the flushing away of oxidized material from the workpiece, improving the precision of electrochemical oxidation, while delivery of charge electrolyte provides for the additional benefit of localized protection of the two or more electric fields interfering with one another. For example, the power supply may include an auxiliary power supply (not shown) that is electrically connected to the at least one electrolyte flushing port on the tool electrode. The auxiliary power supply may supply at least one charging port potentials to the at least one electrolyte flushing port. For example, the at least one charging port potentials may have an applied voltage of 1 volt to 20 volts (positive) with respect to the applied machining voltage (i.e., the two or more potentials).

In one embodiment, the method of the present disclosure further includes electrochemically machining the workpiece to have minimum dimensions of less than 2 µm 730. In a further embodiment, the method of the present disclosure further includes electrochemically machining the workpiece to have minimum dimensions of less than 1 µm.

In an exemplary embodiment, the charged or uncharged electrolyte solution is delivered into the electrochemical machining system from at least one of the at least one electrolyte flushing port at a rate of 1 L/min to 50 L/min, such as 1 L/min to 25 L/min, such as 1 L/min to 10 L/min, such as 1 L/min to 5 L/min.

In some instances, in combination with charged or uncharged electrolyte delivery, the electrolyte solution may be continuously forced though the electrode gap to rinse the workpiece and the tool electrodes at a flowrate of 0.5 L/s to 20 L/s, such as from 3.75 L/s to 10 L/s. Additionally, the electrolyte solution may be continuously forced through the electrode gap at a pressure of 350,000 Pa to 3,500,000 Pa.

Further, in some embodiments, the method includes controlling the distance between the tool electrode and the workpiece (i.e., the length of the electrode gap) to be greater than 0.05 millimeters, such as greater than 0.1 millimeter. In some embodiments, the method includes controlling the distance between the tool electrode and the workpiece to be from 0.1 millimeter to 2 millimeters, such as from 0.5 millimeters to 1.5 millimeters.

Aspects of the present disclosure relate to electrode configurations that incorporate an array of electrodes rather than a solid monolith. The incorporation of an array of electrodes provides for the precise, closed-loop control of the rate of oxidation of the workpiece at strategic locations on the workpiece. Specifically, controlling the individual, applied potentials to each individual electrode of an array of electrodes, as compared to a single potential applied to a solid monolith, offers a number of advantages, including providing the ability to produce components having an improved degree of geometric fidelity using electrochemical machining methods, including components having complex textures and low rigidity structures.

Accordingly, methods and systems described herein allow for electrochemically machining workpieces to have submicron features across a wide range of workpiece chemistries. Moreover, the methods described herein have the advantage of being automated and being able to be tuned in real time, as the potential applied to each individual electrode may be adjusted during electrochemical machining as desired. The present disclosure further incorporates the capability to tune electrolyte delivery and specific applied potentials to achieve high quality surfaces and resulting components having submicron dimensions. Active control of the electric potential and fluid delivery can also allow for the production of components having a non-linear geometry or components containing a high temperature metal alloy that is oxide prone. Further, the at least one electrolyte flushing port in the tool electrode array of the present disclosure may eliminate the need for a traditional flow box to control where and how the electrolyte flows between the tool electrode and workpiece.

Furthermore, in electrochemical machining applications which employ small electrode gaps, the relevant time constant for locally confining the reaction is 10 nanoseconds or less (e.g., 1 nanosecond to 10 nanoseconds). Thus, conducting electrochemical machining using an array of two or more individual electrodes offers improvements in overcoming the signal attenuation and impedance issues of operating a monolithic tool electrode at a high frequency. In this regard, the methods and systems of the present disclosure may provide the ability to manage individualized portions of the overall electric field (i.e., the combination of the two or more electric fields) without sacrificing overall process stability or cycle time.

Further aspects of the invention are provided by the subject matter of the following clauses:

A method of electrochemically machining a component, the method comprising: applying two or more potentials to a tool electrode comprising an array of two or more individual electrodes to generate two or more electric fields in between the tool electrode and a workpiece opposite of the tool electrode, wherein each of the two or more electric fields is generated by one of the array of two or more individual electrodes.

The method of any clause herein, wherein at least one spacer is positioned in between a first electrode and a second electrode of the array of two or more individual electrodes.

The method of any clause herein, wherein the at least one spacer has a thickness of micrometers to 2500 micrometers.

The method of any clause herein, further comprising delivering a charged or uncharged electrolyte solution in between the tool electrode and the workpiece through at least one electrolyte flushing port within the at least one spacer.

The method of any clause herein, wherein the two or more potentials comprise a first potential and a second potential.

The method of any clause herein, wherein at least one of the first potential and the second potential is a direct current potential in a range of 12 volts to 35 volts.

The method of any clause herein, wherein at least one of the first potential and the second potential is a pulsed potential.

The method of any clause herein, wherein the pulsed potential has an average potential of 5 to 32 volts.

The method of any clause herein, wherein the first electrode and the second electrode are electrically connected in parallel with the workpiece.

The method of any clause herein, wherein at least one of the workpiece and the array of two or more individual electrodes comprise a metal material, the metal material comprising a metal alloy including a titanium-based alloy, a niobium-based alloy, a nickel-based alloy, a zirconium-based alloy, an aluminum-based alloy, a palladium-based alloy, a platinum-based alloy, a titanium aluminide alloy, or a combination thereof.

The method of any clause herein, wherein the component is an airfoil on a bladed disk.

The method of any clause herein, further comprising electrochemically machining the workpiece to have minimum dimensions of less than 2 μm.

The method of any clause herein, wherein an electrolyte solution interspaced between the tool electrode and the workpiece comprises an aqueous salt electrolyte, the aqueous salt electrolyte comprising sodium nitrate, sodium chloride, sodium bromide, or a combination thereof.

The method of any clause herein, wherein the applying two or more potentials to the tool electrode is performed selectively such that the tool electrode travels in a non-linear direction into the workpiece.

An electrochemical machining system, comprising: a tool electrode comprising an array of two or more individual electrodes, wherein upon applying two or more potentials to the array of two or more individual electrodes, two or more electric fields are generated in between the tool electrode and a workpiece and wherein each of the two or more electric fields is generated by one of the array of two or more individual electrodes.

The electrochemical machining system of any clause herein, wherein at least one spacer is positioned in between a first electrode and a second electrode of the array of two or more individual electrodes.

The electrochemical machining system of any clause herein, wherein the at least one spacer comprises at least one electrolyte flushing port.

The electrochemical machining system of any clause herein, wherein the first electrode and the second electrode are electrically connected in parallel with the workpiece.

The electrochemical machining system of any clause herein, wherein the two or more potentials comprise a first potential and a second potential.

The electrochemical machining system of any clause herein, further comprising a controller configured to independently control the first potential and the second potential.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An electrochemical machining system, comprising:
   a tool electrode comprising an array of two or more individual electrodes, wherein upon applying two or more potentials to the array of two or more individual electrodes, two or more electric fields are generated in between the tool electrode and a workpiece and wherein each of the two or more electric fields is generated by one of the array of two or more individual electrodes;
   wherein at least one spacer is positioned in between a first electrode and a second electrode of the array of two or more individual electrodes;

wherein the at least one spacer comprises at least one electrolyte flushing port.

2. The electrochemical machining system of claim 1, wherein the first electrode and the second electrode are electrically connected in parallel with the workpiece.

3. The electrochemical machining system of claim 1, wherein the two or more potentials comprise a first potential and a second potential; and wherein the electrochemical machining system further comprises a controller configured to independently control the first potential and the second potential.

4. The electrochemical machining system of claim 1, wherein the at least one spacer has a thickness of 100 micrometers to 2500 micrometers.

5. The electrochemical machining system of claim 1, wherein the workpiece and the array of two or more individual electrodes each include a metal material that is unique from each other.

6. The electrochemical machining system of claim 1, wherein at least one of the workpiece and the array of two or more individual electrodes comprise a metal material, the metal material comprising a metal alloy including a titanium-based alloy, a niobium-based alloy, a nickel-based alloy, a zirconium-based alloy, an aluminum-based alloy, a palladium-based alloy, a platinum-based alloy, a titanium aluminide alloy, or a combination thereof.

7. The electrochemical machining system of claim 1, wherein an electrolyte solution is interspaced between the tool electrode and the workpiece, and wherein the electrolyte solution comprises an aqueous salt electrolyte, the aqueous salt electrolyte comprising sodium nitrate, sodium chloride, sodium bromide, or a combination thereof.

8. The electrochemical machining system of claim 1, wherein the at least one spacer is positioned at a position opposite the workpiece.

9. The electrochemical machining system of claim 1, wherein the two or more potentials comprise a first potential and a second potential; and wherein at least one of the first potential and the second potential is a direct current potential in a range of 12 volts to 35 volts.

10. The electrochemical machining system of claim 1, further comprising:
   an electrolyte supply in fluid communication with the at least one electrolyte flushing port.

11. The electrochemical machining system of claim 10, wherein the electrolyte supply is configured to deliver a charged electrolyte solution or uncharged electrolyte solution to the at least one electrolyte flushing port.

12. The electrochemical machining system of claim 1, wherein the at least one spacer contains a nonconductive material, which electrically isolates the first electrode and the second electrode from each other such that generation of the two or more electric fields may be achieved between the tool electrode and the workpiece.

13. The electrochemical machining system of claim 12, wherein the nonconductive material is a fiberglass reinforced nonconductive material.

14. The electrochemical machining system of claim 1, further including a controller that is operatively connected to a power supply for adjusting voltages of the two or more potentials.

15. The electrochemical machining system of claim 14, wherein the controller is operatively connected to an actuator for adjusting a position of at least one of the tool electrode or the workpiece.

16. The electrochemical machining system of claim 14, wherein the power supply is configured to apply a pulsed potential to at least one of the two or more individual electrodes.

* * * * *